United States Patent
Gaur (10) Patent No.: US 10,423,954 B2
(45) Date of Patent: *Sep. 24, 2019

(54) RESOURCE ACCOUNT APPLICATION MANAGEMENT

(71) Applicant: International Business Machines Corporation, Armonk, NY (US)

(72) Inventor: Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 537 days.

This patent is subject to a terminal disclaimer.

(21) Appl. No.: 14/605,577

(22) Filed: Jan. 26, 2015

(65) Prior Publication Data

US 2016/0217456 A1    Jul. 28, 2016

(51) Int. Cl.
*G06Q 40/00*     (2012.01)
*G06Q 20/38*     (2012.01)
(Continued)

(52) U.S. Cl.
CPC ......... *G06Q 20/385* (2013.01); *G06Q 20/202* (2013.01); *G06Q 20/3278* (2013.01); *G06Q 20/367* (2013.01); *G06Q 20/401* (2013.01)

(58) Field of Classification Search
CPC .... G06Q 20/385; G06Q 20/40; G06Q 20/322; G06Q 20/12; G06Q 20/367;
(Continued)

(56) References Cited

U.S. PATENT DOCUMENTS 5,478,994 A * 12/1995 Rahman ................. G06K 19/07
                                                    235/380
5,953,710 A *  9/1999 Fleming ................. G06Q 20/04
                                                    235/380

(Continued)

FOREIGN PATENT DOCUMENTS

CN        102810189        12/2012
CN        102934132         2/2013
(Continued)

OTHER PUBLICATIONS

"U.S. Appl. No. 14/962,346 Office Action", dated Nov. 30, 2017, 8 pages.
(Continued)

*Primary Examiner* — Thien T Mai
(74) *Attorney, Agent, or Firm* — DeLizio Law, PLLC (57) ABSTRACT

A program product and device for processing a resource account transaction within a wireless electronic device, such as a smartphone or other portable electronic device. During or at the initiation of a resource transaction with a near-field transaction terminal, the device receives from the terminal via a first communication interface, a resource account system ID. A locally stored resource account is selectively identified based on the received resource account system ID. The device sends a resource account application ID corresponding to the selected resource account to the near-field transaction terminal via the first communication interface. From the near-field transaction terminal, the device receives a token ID that is associated with the selected resource account, and sends, the token ID to an account management system via a second communication interface. The device receives from the account management system a transaction token comprising the token ID associated with a specified transaction resource value.

14 Claims, 8 Drawing Sheets

(51) Int. Cl.
*G06Q 20/20* (2012.01)
*G06Q 20/32* (2012.01)
*G06Q 20/36* (2012.01)
*G06Q 20/40* (2012.01)

(58) Field of Classification Search
CPC .. G06Q 20/3278; G06Q 20/36; G06Q 20/401; G06Q 20/382; G06Q 20/20; G06Q 20/4016; G06Q 20/3276; G06Q 20/3674; G06Q 20/38215; G06Q 20/3223; G06Q 20/3672
See application file for complete search history.

(56) References Cited

U.S. PATENT DOCUMENTS

| | | | |
|---|---|---|---|
| 7,827,101 B2* | 11/2010 | Mascavage, III | G06Q 20/04 705/39 |
| 8,296,380 B1 | 10/2012 | Kelly et al. | |
| 2006/0076400 A1* | 4/2006 | Fletcher | G06Q 20/12 235/379 |
| 2010/0001058 A1 | 1/2010 | Grovit | |
| 2011/0244796 A1 | 10/2011 | Kahn et al. | |
| 2011/0283106 A1 | 11/2011 | Cui et al. | |
| 2012/0310760 A1* | 12/2012 | Phillips | G06Q 40/02 705/26.1 |
| 2013/0046643 A1 | 2/2013 | Wall et al. | |
| 2013/0159186 A1 | 6/2013 | Brudnicki et al. | |
| 2013/0204728 A1 | 8/2013 | Lichterman et al. | |
| 2015/0032627 A1* | 1/2015 | Dill | G06Q 20/385 705/44 |
| 2015/0033289 A1* | 1/2015 | Caceres | H04W 12/08 726/3 |
| 2017/0041469 A1* | 2/2017 | Homma | G06F 13/00 |

FOREIGN PATENT DOCUMENTS

| | | |
|---|---|---|
| CN | 103679443 | 3/2014 |
| CN | 104272331 | 1/2015 |

OTHER PUBLICATIONS

"U.S. Appl. No. 14/962,346 Final Office Action", dated Jul. 6, 2018, 13 pages.

"CN Application No. 201610051654.6 Office Action", dated Dec. 20, 2018, 10 pages.

"U.S. Appl. No. 14/962,346 Office Action", dated Nov. 29, 2018, 14 pages.

* cited by examiner

| APP ID | ACCT ID | | PARAMETER | |
|---|---|---|---|---|
| APP_1 | ACCT_1 | ACCT_2 | LOCAL | LEVEL 2 |
| APP_2 | ACCT_3 | | LEVEL 1 | |
| APP_3 | ACCT_4 | | LOCAL | BC |
| ⋮ | ⋮ | | ⋮ | |

| PARAMETER | C_REG | REG_VAL |
|---|---|---|
| GEO | CR_1 | LOCAL |
| AUTHEN_NFC_ID | CR_2 | LEVEL 2 |
| BC | CR_3 | BC |
| ⋮ | ⋮ | ⋮ |

RESOURCE ACCOUNT APPLICATION MANAGEMENT

BACKGROUND

Embodiments of the inventive subject matter generally relate to the field of managing resource accounts in multi-device, multi-system computer transactions. More particularly, the inventive subject matter relates to securely and efficiently selecting and utilizing a resource account in a tokenized transaction.

Magnetic stripe cards have long been the main form of performing mobile electronic transactions in which a reader in a point-of-sale (POS) or other transaction terminal receives account information encoded in the stripe. These magnetically encoded cards are used for retail purchases, coupon redemption, etc. The account data retrieved from a card is sent by the transaction terminal to a resource account server that responds with authorization to apply resources from a specified resource account such as a monetary credit account.

Substantial developments in the capacity and flexibility of operation of mobile electronics devices such as smartphones has resulted in developments in mobile electronic payments by portable electronic devices such as smartphones. Short-range (also referred to as near-field) RF interfaces, such as Bluetooth and near-field-communication (NFC), are typically utilized for mobile electronic transactions rather than the traditional magnetic stripe readers. Mobile payment solutions include electronic or mobile money and electronic or mobile wallets. While mobile payment systems continue to develop using recently developed technology, security remains a significant issue for electronic transaction systems.

SUMMARY

A method is disclosed for processing a resource account transaction within a wireless electronic device, such as a smartphone or other portable electronic device. During or at the initiation of a resource transaction with a near-field transaction terminal, the device receives from the terminal via a first communication interface, a resource account system ID. A locally stored resource account is selectively identified based on the received resource account system ID. The device sends a resource account application ID corresponding to the selected resource account to the near-field transaction terminal via the first communication interface. From the near-field transaction terminal, the device receives a token ID that is associated with the selected resource account, and sends, the token ID to an account management system via a second communication interface. The device receives from the account management system a transaction token comprising the token ID associated with a specified transaction resource value.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
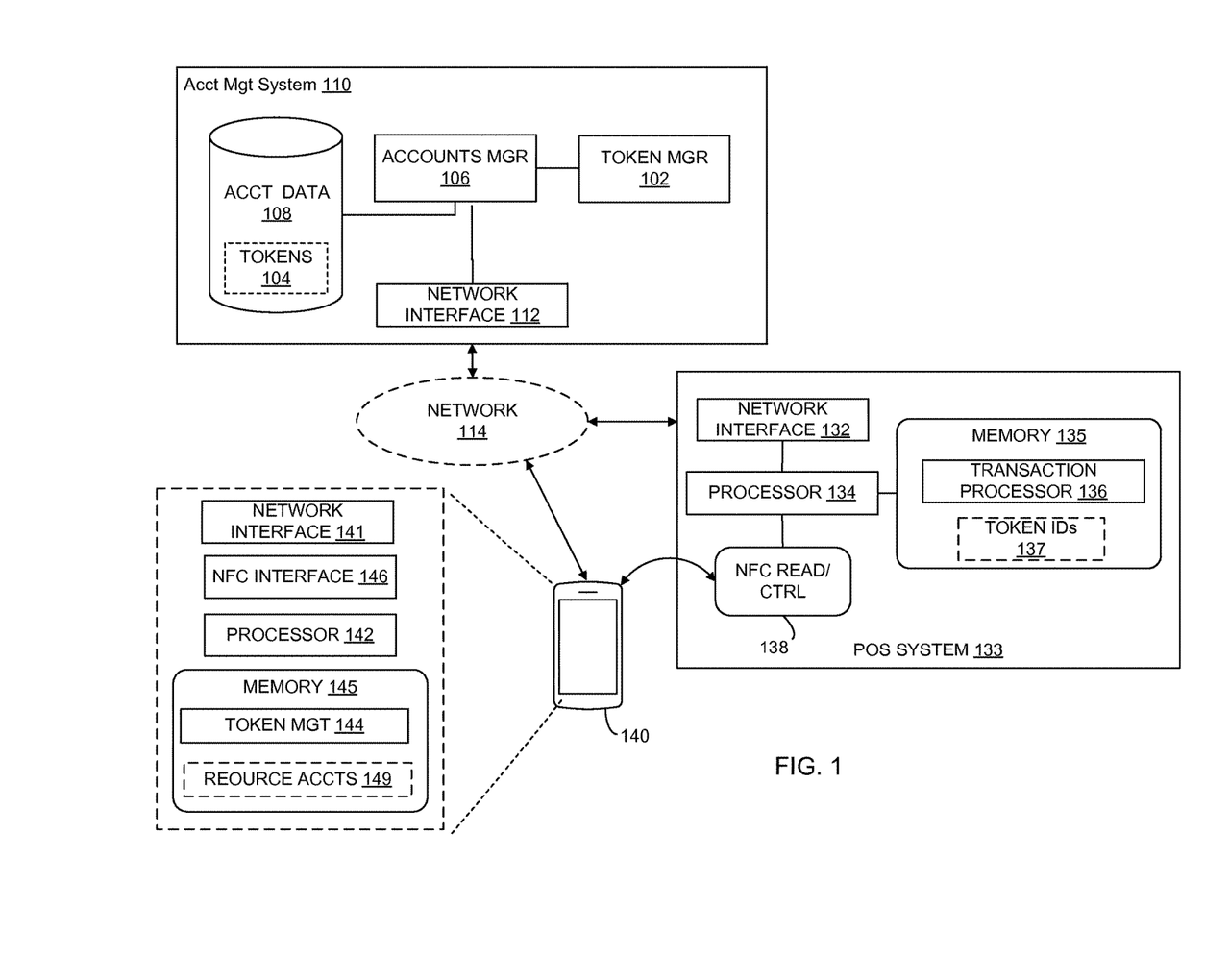
FIG. 1 is a high-level system diagram depicting components that are included in or may interact with a tokenized resource account selection and security system in accordance with an embodiment.

Embodiments described herein enable secure mobile device resource transactions, such as point-of-sale (POS) transactions, using near-field messaging and information exchange as well as information exchange with a network-accessible resource account management system. FIG. 1 is a high-level diagram depicting systems and devices that are included in or may interact with a tokenized resource account selection and security system in accordance with an embodiment. The systems include a network 114 providing connectivity over which an account management server 110 communicates with a wireless device 140 and a POS system 133. The connectivity may be established by multiple sub-networks and different types of network components, connection media and protocols, and carrier services such as fiber optic cables, telephone lines, Ethernet 802, and Internet protocols. In one aspect, network 114 enable communications between wireless device 140 and account management server 110 in support of resource account information exchange for a specified account among multiple resource accounts (not depicted) managed by an account manager 106 within account management server 110. In another aspect, network 114 enables communications between account management server 110 and POS system 133 in support of resource account transactions in which account management server 110 authenticates or otherwise validates encoded account information provided to POS system 133 such as by wireless device 140.

Account management server 110 and accounts manager 106 are typically associated with a financial institution such as a bank or credit issuing institution that establishes and organizes monetary accounts associated with and accessible by account clients. In the depicted embodiment, account management server 110 includes a network interface 112 that enables communications across network 114 between resource accounts manager 106 and resource account applications executed from device 140 and/or POS system 133. Accounts manager 106 processes account information stored within an accounts database 108, which stores account data, typically on behalf of individual users or institutions, that may include debit and credit accounts, transaction types (e.g., online or offline), and transaction instruments (e.g., credit card, debit card, etc.). Accounts manager 106 performs related roles of tracking account information and verifying the account information during POS transactions such as conducted between wireless device 140 and POS system 133. During a payment transaction, for example, account management server 110 may send a transaction authorization to POS system 133 in response to processing specific transaction information (e.g., purchase amount and account identification) sent by POS system 133.

Account management server 110 further includes a transaction token manager 102 that may be integrated with or otherwise communicatively or logically associated with accounts manager 106. Token manager 102 generates and maintains transaction tokens 104 in association with accounts stored within accounts database 108. In the case of a tokenized financial transaction, tokens are used to replace sensitive resource account data with a relatively unique identifier that is difficult or impossible to mathematically reverse. In accordance with embodiments depicted and described with reference to FIGS. 2-8, token manager 102, in conjunction with accounts manager 106, may process token requests from end-user devices such as mobile device 140. In one embodiment, such token requests include a token ID as well as resource account ID information and transaction-specific information such as a transaction ID that account manager 106 and/or token manager 102 process to generate account-specific and transaction-specific tokens. The token ID is typically an alphanumeric or other suitably coded data structure utilized to representing a transferrable transaction resource. A token generated in response to a token request may comprise a token ID, which may be the same as or otherwise corresponds to the received token ID, and a specified transaction resource value. The resource account data 108 (e.g., customer and account identity and data) is centrally stored and managed by accounts manager 106, which as explained above, is typically operated by the underlying resource provider or broker.

POS system 133 is depicted as including a network interface 132 for communicating across network 114, a processor 134, and associated system memory 135. A transaction processor application 136 is stored in memory 135 and executed by processor 134 in support of payment transactions such as between wireless device 140 and POS system 133. Transaction processor application 136 includes executable code and logical processing constructs for processing payment account information received at a payment interface such as NFC reader 138, and generating a corresponding payment account authorization request that POS system 133 sends to account management server 110. More specifically, POS system 133 executes transaction processor application 136 to read account data from a payment device and utilize the account data to confirm via communications with resource server 110 that authorized account resources are available. Transaction processor application 136 further includes executable code and logic constructs for cooperating with account management server 110 in transferring the account resources (e.g., monetary credit) from the specified account to another account, and also to record the transaction. In the depicted embodiment, transaction processor 136 further includes program instructions for generating, managing, or otherwise processing token IDs 137. As explained in further detail with reference to FIGS. 2-8, transaction processor 136 may include program instructions for sending a token ID to mobile device 140 during a POS transaction as part of a resource account system advertisement message.

Wireless device 140 includes a network interface 141, a processor 142, and an associated system memory 145 that stores data and system and application software. Network interface 141 comprises hardware and software components to implement transceiver connectivity and protocol processing to enable wireless device 140 to communicate with network-connected devices such as resource server 110 and POS system 133. Network interface 141 includes a wireless network interface controller (not depicted) and other devices and logic components for connecting, disconnecting and sending and receiving messages across local and wide area networks. Processor 142 and memory 145 provide additional processing capability necessary for network communications and furthermore enable wireless device 140 to perform other information handling tasks related to, incidental to, or unrelated to the methods described herein. In various embodiments, wireless device 140 may be contained in different external dimensions, packaging, and form factors. Mobile device 140 may be a cell phone or other type of mobile phone or highly integrated portable device such as a smartphone or any other type of portable electronic device having network connectivity.

Wireless device 140 further includes a transaction communication interface in the form of a Near Field Communication (NFC) interface 146 in the depicted embodiment. NFC is a form of "contactless" RF communication technology that enables one-way or two-way communication between terminals (devices or endpoints) that are in relative close proximity (typically a within a few centimeters). NFC interface 146 typically comprises a controller and specialized, near-field antenna for communicating with POS system 133 through an NFC interface 138. A transaction service connection may be established by positioning, waving, or otherwise moving wireless device 140 in near physical proximity to NFC interface 138. In some embodiments, a connection may also be established by directly contacting wireless device 140 and a reader such as NFC interface 138.

The depicted systems and components generally enable account resource transactions whereby, for example, a user may make payments using accounts maintained by and associated with the user by the components within account management server 110. NFC-enabled devices such as wireless device 140 are examples of devices that may be used for mobile resource transactions such as mobile POS (mPOS) transactions. Fundamentally, an NFC service transaction between a mobile device, such as device 140, and a POS terminal such as POS system 133 entail the NFC controller and associated transaction applications emulating a physical transaction service payment instrument such as a credit card. For example, wireless device 140, which is typically hand-carried by a user, may interact with POS system 133, which is typically included in onsite retail transaction equipment of a vendor, to process a payment transaction as follows.

Wireless device 140 operates as an initiator device and therefore begins a service transaction by requesting a peer-to-peer service transaction with POS system 133, which operates as the target device. The respective controllers within NFC interfaces 146 and 138 operate in request/reply mode following the initial request for service to process and complete the transaction. In the depicted embodiment, the controller within NFC interface 146 directly or indirectly (e.g., via security logic) communicates with a token management application program 144 that is associated with locally stored resource account information 149 and includes program instructions for interacting with account management server 110 via the network interface. During a local POS transaction, wireless device 140 may communicate with account management server 110 to access applicable account information which can then be used in the transaction. In the case of device pairing, wireless device 140 may be communicatively coupled, such as via a Bluetooth connection, with a simpler device that is not network enabled, such as a wearable device (not depicted), and operates as an intermediary, transferring account information from account management server 110 to the wearable device. POS system 133 receives and processes the account information from wireless device 140 or a paired wearable device in order to complete the transaction.

Distributed transmission, storage, and usage of actual account data present a variety of account data security issues. For wireless device 140 and any paired wearable device, the embodiments described herein provide a tokenized transaction service that addresses data security issues that may otherwise arise. Namely, wireless device 140 may retrieve, store, process, and send transaction tokens during resource account transactions with POS system 133 such that little, if any, account information is required to be transferred between device 140 and POS system 133.

Figure 2:
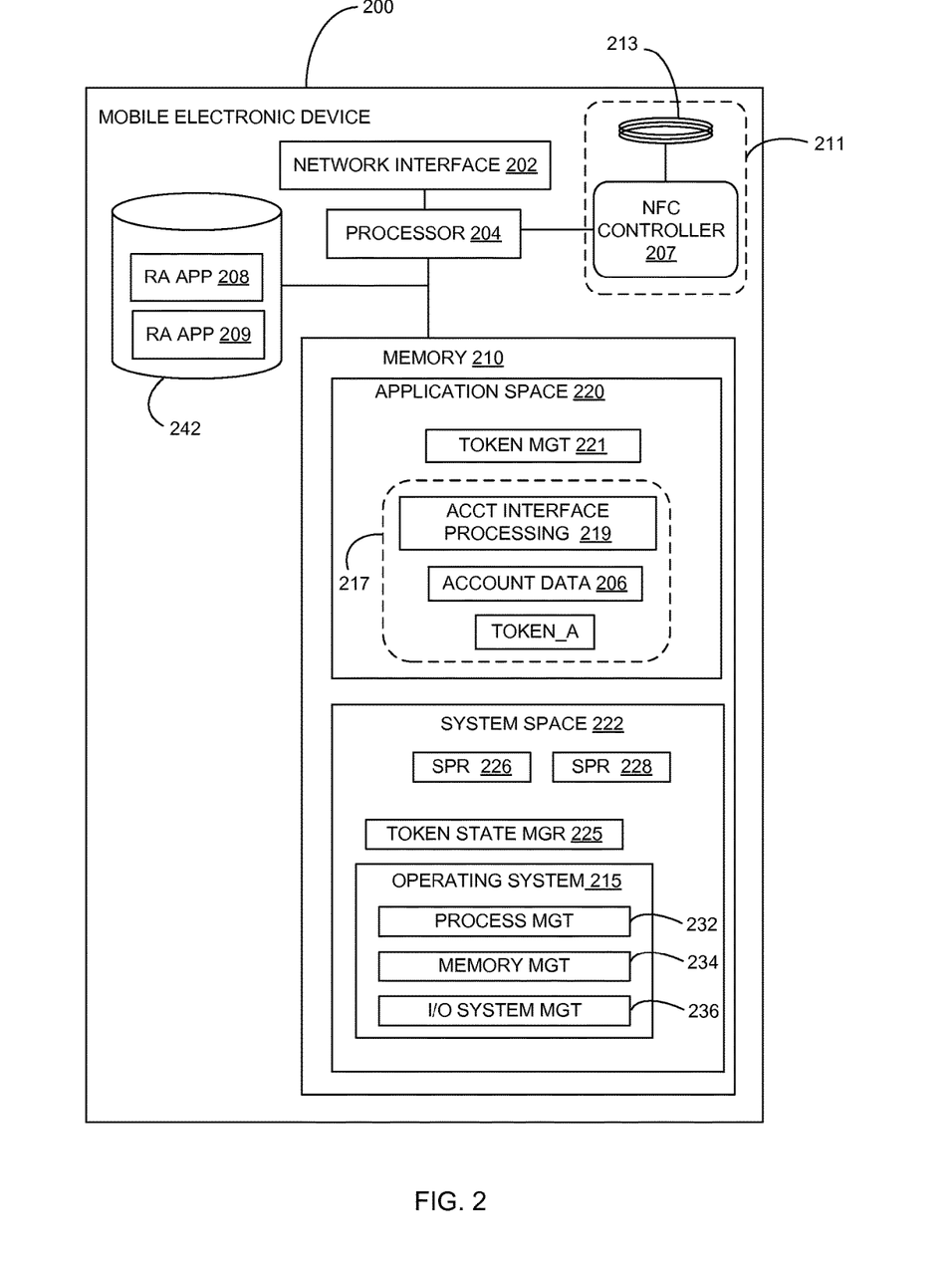
FIG. 2 is a block diagram illustrating a network-enabled and near-field transaction enabled mobile electronic device in accordance with an embodiment.

FIG. 2 is a block diagram illustrating a mobile (i.e., handheld, portable form factor) electronic device 200 in accordance with an embodiment. It should be noted that components and functions that are typically included with a mobile electronic device such as user input/output mechanisms and displays may be incorporated in device 200 but are not illustrated to avoid obfuscation. The depicted embodiment shows mobile device 200 as including a network interface 202 such as may be included with a wireless, network-enabled mobile phone. Mobile device 200 further includes a host processor 204 and associated host memory 210 which cooperatively function to manage various system-level and application-level programs and data that enable device 200 to perform various transaction service tasks associated with transaction resource accounts such as those described with reference to FIG. 1. In the depicted embodiment, device 200 further includes non-volatile storage 242 storing resource account applications 208 and 209, and a near-field communication interface in the form of an NFC interface 211. NFC interface 211 comprises an NFC controller 207 for communicating with a POS or other active NFC transaction terminal. NFC interface 211 also includes an NFC antenna 213 for generating and maintaining wireless connectivity with other NFC devices such as an NFC-enabled POS system.

Consistent with known memory management and organization, memory 210 is allocated between a system memory addressable space 222 and an application-level addressable space 220. System memory space 222 stores programs (and supporting data) that control operations of mobile device 200 and its components. Similar to many known computer systems, the system software stored within system memory space 222 includes operating system (OS) software that coordinate all the activities among computer hardware devices, and utility program software that performs a specific task, usually related to managing a computer, its devices, or its programs.

In the depicted embodiment, an operating system (OS) 215 and a token state manager utility 225 are maintained within system memory space 222. OS 215 may be a flexible, multi-purpose OS such as the Android OS found in smartphones or may be an embedded OS having more specialized function such as may loaded within a wearable electronic transaction device. OS 215 generally comprises code for managing and providing services to hardware and software components within mobile device 200 to enable program execution. Among other code and instructions, OS 215 includes process management code 232 comprising instructions for interfacing application code with system hardware and software. OS 215 further includes memory management code 234 for allocating and managing memory for use by application and system-level programs. OS 215 further includes I/O system management code 236 including device drivers that enable the system's hardware to communication with external computer systems.

Representative of either of resource account applications 208 or 209 is a resource account application 217 that has been loaded into application memory space 220. For example, resource account application 217 may be an application program including program instructions and data associated with a specified credit card account, or may be an application program comprising program instructions and data associated with a specified retail merchant account. Resource account application 217 contains program instructions and associated data for managing a respective transaction resource account, such as a checking or savings account, and includes an account interface module 219 and account data 206. Account interface module 219 operates to enable processing and retrieval of resource account information including transaction exchange value information (e.g., monetary value information) available from one or more user accounts managed by an account management system such as account management server 110 depicted in FIG. 1. Resource account application 217 further includes a token management module 221 that includes instructions and data for requesting, receiving, processing, and sending token identification (ID) information to and from a near field transaction terminal and a network interface to coordinate token generation during a POS transaction. In one aspect, token management module 221 operates to request, retrieve, receive and/or otherwise obtain a token ID from a transaction terminal, to store the token ID, and to send the token ID with transaction ID information and/or resource account ID information to an account management system via network interface 202. Token management module 221 further includes instructions and data for receiving and processing a token, such as depicted Token_A, that has been received from an account management system in the manner depicted and described with reference to FIGS. 3-8.

A token, such as Token_A, may be used in processing vending transactions as, in effect, a replacement for account information that would otherwise be required by a POS system to identify a resource account and to validate the account and confirm that adequate account resources are available for a given transaction. Each token includes a token ID and a transaction resource value. The token ID may be a pseudo-randomly generated number or alphanumeric code that is assigned and recorded when the token is initially generated. The token ID may alternately be an alphanumeric code that matches or otherwise corresponds to a token ID received by mobile device 200 from a POS system. The transaction resource value is typically a numerical monetary value specified in designated exchange units. As explained in further detail with reference to FIG. 4, tokens further include or are otherwise logically associated with condition or validation parameters that are generated by any of a resource account manager, a mobile device such as device 200, or other intermediary device that may obtain the tokens to limit the conditions under which the tokens may be utilized in resource transactions.

In addition to the token retrieval and management provided at an application-level by token management module 221, device 200 includes system-level token management program instructions that cooperatively enable conditioning and processing of token transactions for tokens having specified validation parameters. Specifically, system memory space 222 includes a token state manager 225 that operates in conjunction with OS 215 and token management module 221 to condition/limit token transactions in accordance with processing and network environment factors as well as transaction-specific conditions. In the depicted embodiment, token state manager 225 has programmed access to a set of one or more special purpose registers (SPRs) 226 and 228 (also referred to as condition registers) that store specified event and condition data relating to whether and/or to what extent a particular token transaction may be processed. In one embodiment, SPRs 226 and 228 may store data or single-bit or multiple-bit flags indicating conditions that token state manager 225 uses to determine whether or not to issue a transaction modification call. As explained in further detail with reference to FIGS. 3-7, token state manager 225 may be invoked by a resource account application or by a transaction communication interface, such as NFC interface 211, during transaction processing. Token state manager 225 operates to determine whether or not to issue a transaction modification call depending on how conditions specified by the SPRs relate to (are processed with respect to) validation parameters associated with a token.

Figure 3:
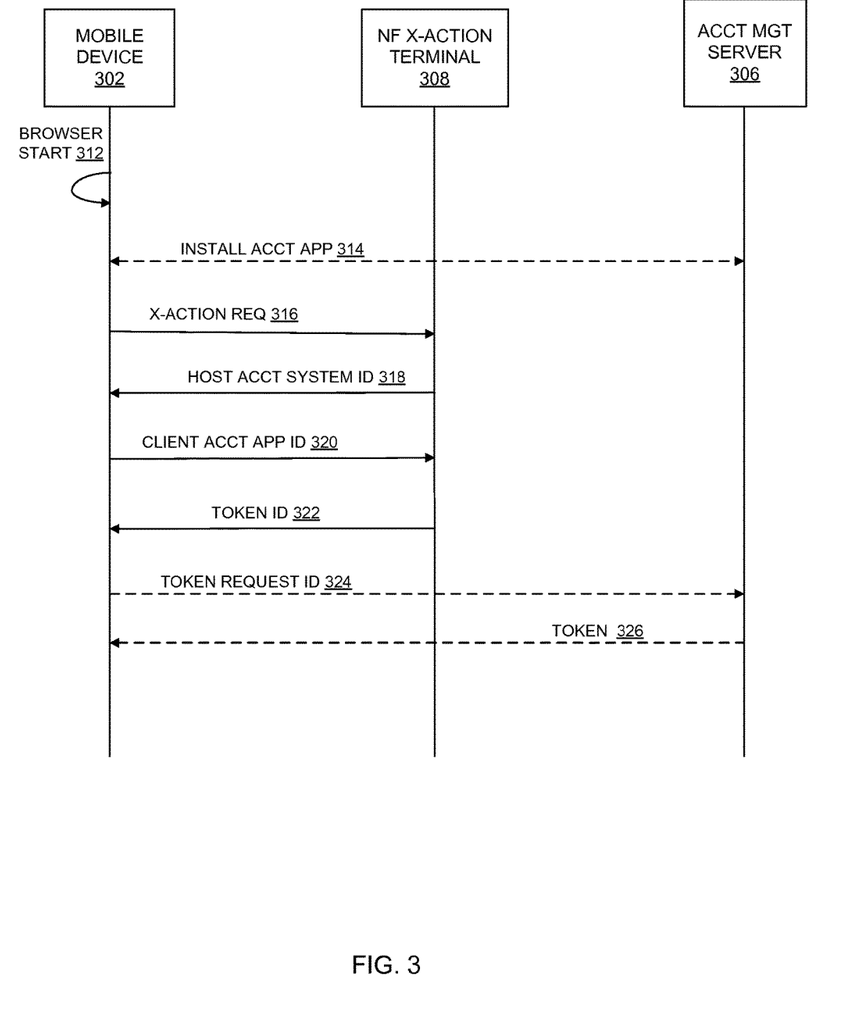
FIG. 3 is a signaling diagram depicting a tokenized resource account selection message protocol in accordance with an embodiment.

FIG. 3 is a signaling diagram depicting a protocol for generating, transferring, and processing tokens in accordance with one embodiment. The entities operably involved in the example token transfer process include a mobile device 302 that communicates with a near-field transaction terminal 308 using a near-field communication interface to process POS transactions. Mobile device 302 also includes a network communication interface via which it communicates with an account management server 306 that includes hardware and software for managing resource accounts and for processing $3^{rd}$ party transactions. Mobile device 302 is a network-enabled portable electronic device, such as a smartphone, that includes a locally stored resource account program that may be executed in conjunction with a network access program, such as a web browser, to communicatively access account management server 306 across a network.

The protocol begins as shown with mobile device 302 executing a network access program such as a web browser access 312 followed by a network transaction 314 in which mobile device 302 installs a resource account application program received from account management server 306. The locally installed resource account application program includes a specified application program ID and enables mobile device 302 to access, modify, and send specified resource account information and requests to and from account management server 306. Mobile device 302 includes a near-field communication interface that can be used to initiate an account service transaction such as via a transaction request 316 sent from mobile device 302 to transaction terminal 308. During transaction initialization, transaction terminal 308 sends a resource account system ID to mobile device in an account advertisement message 318. The resource account system ID may be a numeric or alphanumeric code that serves to uniquely identify a resource account system (i.e., system that manages client resource accounts), such as a merchant credit account system, associated with a particular vendor or account manager.

Following receipt of the account system ID from transaction terminal 308, mobile device 302 sends an advertisement reply message 320 that includes a locally stored (i.e., stored within mobile device 302) resource account application ID. As illustrated and depicted in further detail with reference to FIG. 5-7, the resource account application ID provided with reply 320 is identified based in some manner on the content of the host provided account system ID provided in advertisement 318. For example, the advertisement message 318 may include a message sent to a display of the mobile device 302 that identifies a specified credit card system and requests or otherwise inquires about whether the user chooses the specified credit system to be utilized in a current payment transaction. Mobile device 302 may match, compare, or otherwise process the received account system ID with locally stored resource account IDs or account application IDs to select the ID to be sent in reply message 320.

As further depicted, transaction terminal 308 processes the resource account application ID received in reply 320, and sends a token transaction invite message 322 to mobile device 302. The token transaction invite message 322 includes a token ID and may include a message sent to a display screen requesting or otherwise inquiring regarding whether the user chooses to engage in a secure token transaction. Mobile device 302 then sends a token request message 324 including the received token ID to account management server 306 for processing by token generation logic and data. In response to processing the token and account information associated with a transaction ID or account ID that may have been included in request 324, account management server 306 send a token issuance message 326 that includes at least one token and associated account information. Mobile device 302 stores the token(s) in local storage in association with a corresponding resource account application. For example, if account management server 306 issues a token to be used as a transaction item for a specified credit card account, mobile device 302 stores the token in local storage and in memory allocated for a resource account application corresponding to the credit card account.

Figure 4:
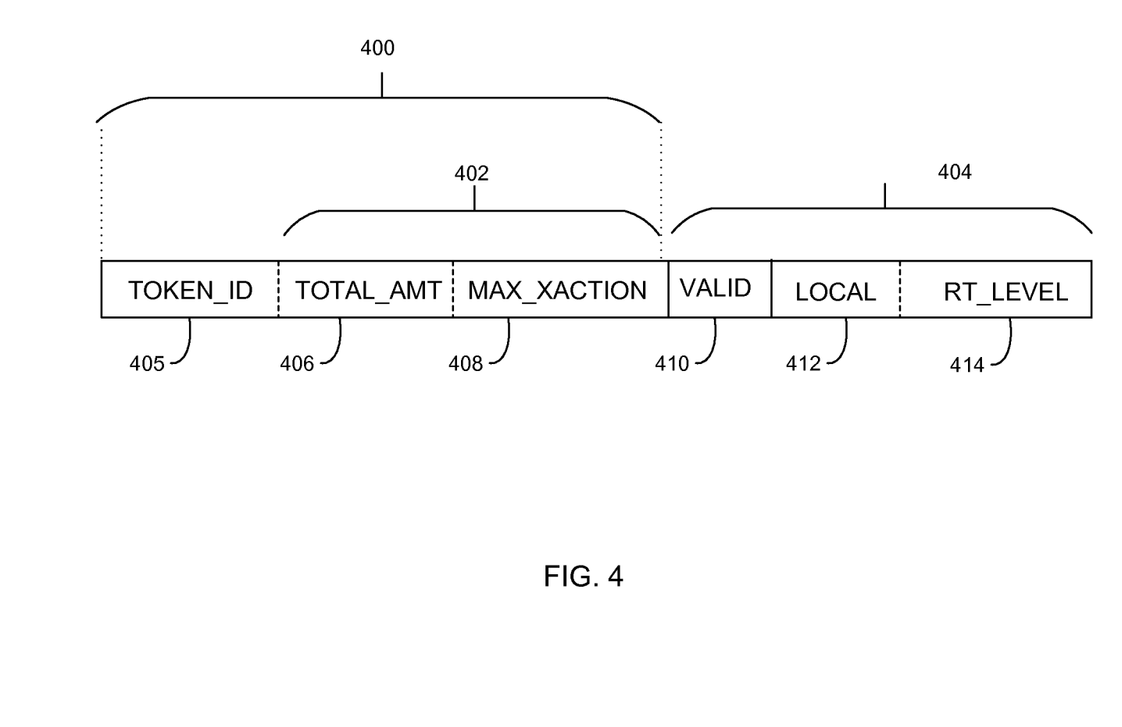
FIG. 4 is a conceptual diagram illustrating a token construct in accordance with an embodiment.

FIG. 4 is a conceptual diagram illustrating a token construct in accordance with one embodiment. The depicted token construct includes a token 400 that may be generated by a resource account program stored within an account management server. Token 400 includes a token ID field 405 that contains a numeric or alphanumeric ID code that serves to identify the token such as by a token recipient terminal which sends the token ID to a resource account manager which can map the ID to centrally stored account information. The token ID may match or otherwise correspond to a token ID received by an account management server from a mobile device as part of a token request message, or may be pseudo-randomly generated by the account management system. Token 400 further includes token resource value fields 402 comprising a total amount field 406 and a maximum transaction limit field 408. Total amount field 406 specifies a number of resource transaction units (e.g., number of US dollars, number of credit awards points, etc.) that are assigned to token 400 and may be transacted via resource transactions, such as POS transactions. Maximum transaction limit field 408 specifies the maximum number of transaction units authorized to be used in any single resource transaction.

As further depicted, a set of validation parameter fields 404 are logically associated with token 400. The association of validation parameter fields 404 with token 400 may be implemented by a resource account application stored locally on a portable electronic device. The association may be effectuated by inserting validation parameter values within pre-specified fields in a token data structure, or by concatenating a tag data structure containing the respective validation parameter fields onto the token data structures. Alternatively, the data structure entailing token 400 and validation parameter fields 404 may be maintained in separately named and stored data structures that are otherwise programmatically associated such as via a locally stored resource account application program. Validation parameter fields 404 may be encoded with parameter values at some point during token processing to specify environmental or transactional conditions and are compared with condition data that are tracked and stored in corresponding condition registers. As shown in the depicted embodiment, validation parameter fields 404 store values that are recorded in a token VALID field 410, a LOCAL field 412, and a RT_LEVEL field 414.

Token VALID field 410 may comprise a single bit flag that may be asserted and/or de-asserted in response to client input to a resource account application, or by operation of a locally stored and executed token manager or token state manager. LOCAL field 412 comprises a single or multi-bit flag defining a transaction-invalidating or transaction-modifying condition to be a condition in which the mobile device is not currently located within a specified geographic boundary, such as may be determined by Global Positioning System (GPS) functionality. RT_LEVEL field 414 contains a value specifying a transaction type (e.g., transaction requiring express POS terminal authentication) or other resource transaction characterization (e.g., transaction requiring a particular POS terminal authentication security level) for which the token is or is not authorized to be used.

Figure 5:
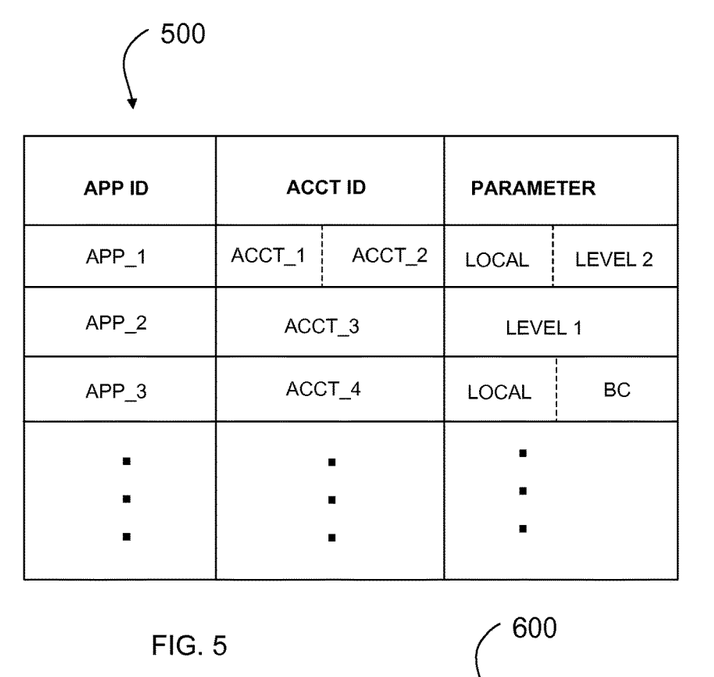
FIG. 5 is a conceptual diagram depicting a resource account table in accordance with an embodiment.

FIG. 5 is a conceptual diagram depicting a resource account table 500 in accordance with an embodiment. Resource account table 500 may be stored locally within a mobile device memory and includes entries for each of multiple resource account application IDs including APP_1, APP_2, and APP_3, each having one or more associated account IDs. In the depicted embodiment, resource account IDs ACCT_1 and ACCT_2, are both associated with resource account application ID APP_1, while resource account IDs ACCT_3 and ACCT_4 are each individually associated with resource account application IDs APP_2 and APP_3, respectively. In one embodiment, a resource account application ID comprises an alphanumeric code that identifies a client-specific instance of a resource account application program that is stored on and executed from a mobile device. Such a resource account application program comprises executable instructions for managing one or more user resource accounts in communication with a remote account management system. The one or more resource account IDs associated with a given resource account application ID may comprise alphanumeric codes that identify the resource accounts and underlying resource account information. For example, resource account ID ACCT_1 may be a first credit card account ID while ACCT_2 may be a second credit card ID, both managed by the same resource account application program, APP_1.

Table 500 further associates one or more validation parameters with each of the resource account application IDs and resource account IDs. In the depicted embodiment, parameters LOCAL and LEVEL_2 are associated with ACCT_1, ACCT_2, and APP_1, LEVEL_1 is associated with ACCT_3 and APP_2, and LOCAL and BC are associated with ACCT_4 and APP_3. LEVEL_1 and LEVEL_2 comprise values specifying a transaction type (e.g., transaction requiring express POS terminal authentication) or other resource transaction characterization (e.g., transaction requiring a particular POS terminal authentication security level) for which the token is or is not authorized to be used. The LOCAL parameter comprises a value defining a transaction-invalidating or transaction-modifying condition to be a condition in which the mobile device is not currently located within a specified geographic boundary, such as may be determined by GPS functionality. The BC parameter comprises a single-bit value defining a transaction-invalidating or transaction-modifying condition in terms of whether or not a body contact condition is detecting during or prior to a transaction. For example, assertion of the single-bit BC parameter indicates a condition that invalidates use of a token in response to detecting that physical contact between a user and a wearable electronic device has been lost or interrupted during or prior to a transaction.

Parameters LEVEL_1, LEVEL_2, LOCAL, and BC may be entered into table 500 via a resource account application and/or an associated token management application, or via a multiple account management application (not depicted) such as an electronic wallet application. A resource account or token state manager may access table 500 to apply the LEVEL_1 and LEVEL_2 parameters to tokens generated in association with APP_1, APP_2, ACCT_1, ACCT_2, or ACCT_3 by entering these values into corresponding token validation parameter fields such as the RT_LEVEL field 414 shown in FIG. 4. Similarly, the specified parameter value LOCAL is associated with APP_1 and APP_3 and therefore may be applied to any subsequently generated tokens (e.g., by entering the value into the LOCAL field 412) corresponding to APP_1, APP_3, ACCT_1, ACCT_2, or ACCT_4. As explained in further detail with reference to FIG. 7, a token manager application or token state manager may access resource account table 500 during processing of a token advertisement to select a preferred resource account and implement client-side token usage restrictions.

Figure 6:
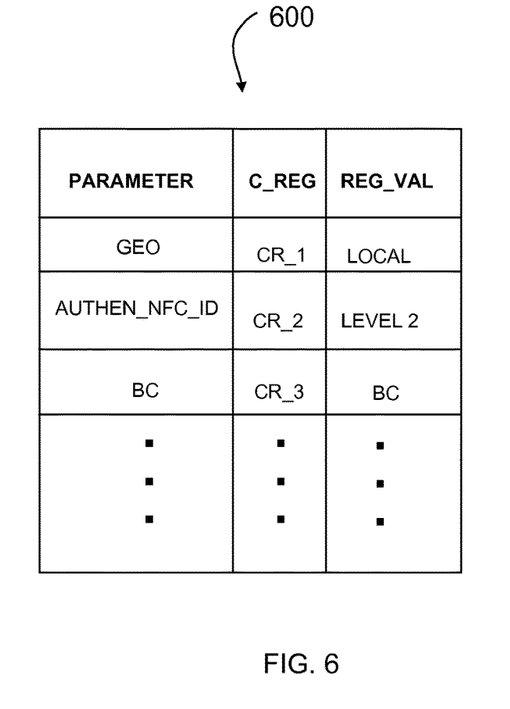
FIG. 6 is a conceptual diagram illustrating a token state manager transaction condition table in accordance with an embodiment.

FIG. 6 is a transaction condition table 600 in accordance with an embodiment. A token state manager may access table 600 in response to the mobile device receiving a transaction token from an account management system and comparatively process stored condition register data contained within table 600 with one or more validation parameters that have been associated with the token subsequent to receipt of the token from the account management system. Table 600 includes multiple row-wise entries that each associate a condition register ID and corresponding register value with a specified parameter type. The PARAMETER column includes multiple application or system modifiable fields that specify the types/categories of parameters and corresponding conditions will be recorded as system conditions or preset requisite limits in the respective rows. The parameter types specified under PARAMETER include a geographic location, GEO, an NFC reader authentication level, AUTHEN_NFC, and a body contact flag, BC. Respectively associated with each of the specific parameter types are fields in the C_REG column that specify the identity of individual condition registers, and the fields in adjacent column REG_VALUE that specify recorded values in the corresponding condition registers.

The GEO row-wise entry includes a field identifying condition a register CR_1 as storing a current geographic location (e.g., LOCAL or REMOTE) detected by the mobile device. The AUTHEN_NFC_ID row-wise entry includes a field identifying the condition register CR_2 as holding an NFC reader authentication level (from among LEVELS 1-3, for example) value. The BC row-wise entry may be included in a transaction condition table for tokenized transaction in which tokens may be transferred by a wearable electronic device have a body contact sensor. The illustrated BC row-wise entry includes a field identifying a condition register CR_3 as holding a flag indicating whether the host wearable token transfer device currently detects being in some form of physical contact or proximity with a user (e.g., wearer) of the device. In one embodiment, prior to or during a resource transaction, such as a POS transaction, a token state manager compares the registers values stored in table 600 with validation parameter values that have been associated with a received transaction token. The token state manager applies transaction condition rules that specify whether to invalidate the subject transaction token(s) or modify or cancel the transaction based on the comparison.

Figure 7:
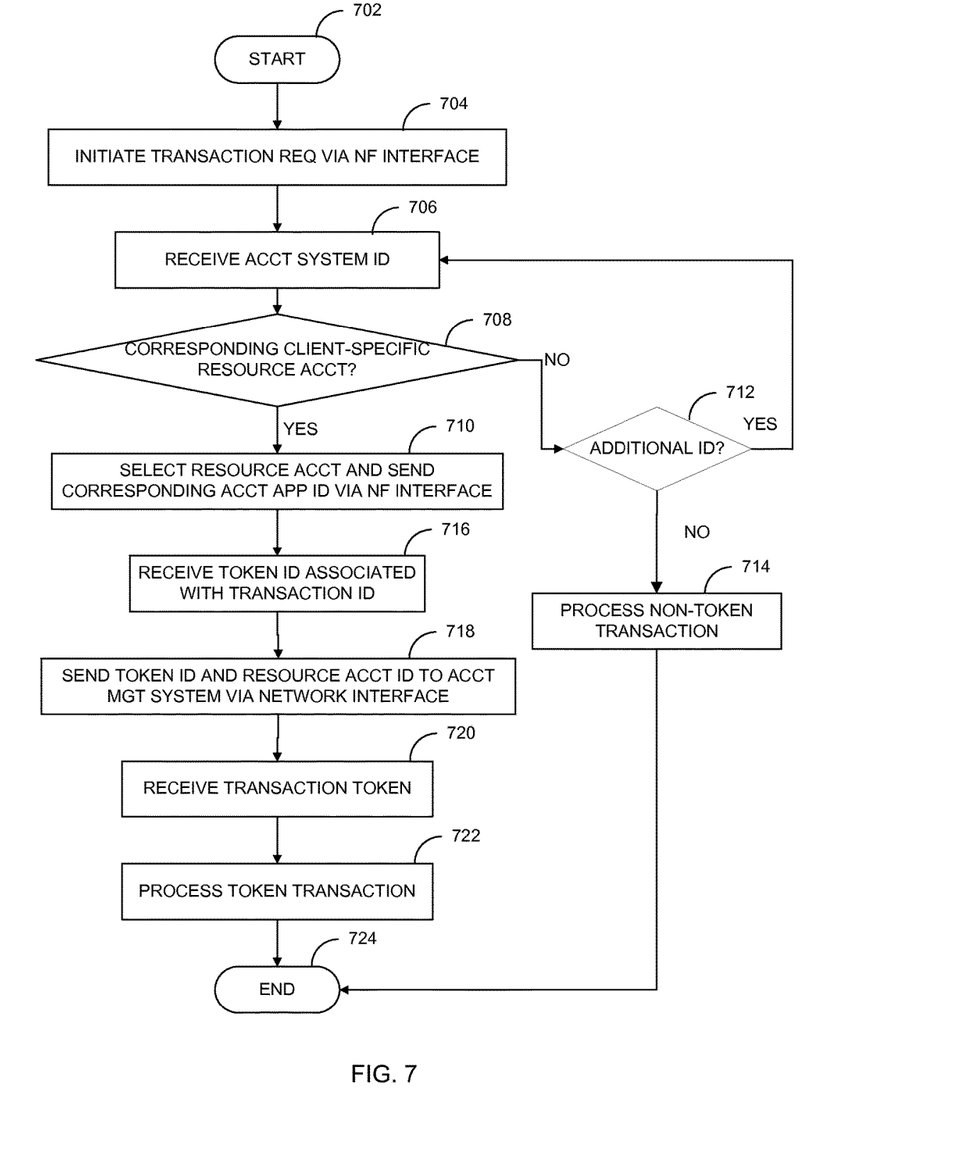
FIG. 7 is a flow diagram illustrating steps performed during tokenized resource account selection in accordance with an embodiment.

FIG. 7 is a high-level flow diagram illustrating steps performed during tokenized resource account selection in accordance with an embodiment. The process begins as shown at steps 702 and 704 with a mobile device initiating a resource transaction with a transaction terminal In an embodiment, the mobile device initiates the resource transaction by sending a transaction or startup request over a near-field communication interface to a corresponding interface of a near-field transaction terminal which may be a POS terminal. The process continues with the transaction terminal advertising a potentially applicable resource account type by sending a resource account system ID which is received by the mobile device as depicted at step 706. The resource account system ID may be a numeric or alphanumeric code that identifies a particular proprietary or otherwise specified resource account provider, such as a vendor-specific credit system that manages multiple client-specific resource accounts.

As depicted at step 708, a resource account application or resource account management application within the mobile device processes the received resource account system ID to select or selectively identify a corresponding client-specific resource account stored that is stored within or otherwise accessible by the mobile device. If a corresponding resource account is not found, the mobile device replies to the account advertisement accordingly and the transaction terminal may send an additional account advertisement by sending an available alternate resource account system ID and the cycle repeats (steps 712 and 706). If no corresponding resource account is found and no further resource account system IDs are available for advertising, the process may continue with a non-tokenized resource transaction as illustrated at steps 712, 714, and 724.

If a corresponding resource account is identified, such as by matching the received resource account system ID with entries in a locally stored resource account table, the mobile device responds by sending a corresponding resource account application program ID to the transaction terminal (step 710). The transaction terminal processes the application program ID received from the mobile device to generate or otherwise provide a token ID that can be used in association with the resource account application corresponding to the application ID. As depicted at steps 716 and 718, the mobile device receives the token ID in association with a transaction ID generated by the transaction terminal and responds by sending a token request that includes the token ID in association with the transaction ID to an account management system via a network communication interface.

In one embodiment, the mobile device selectively identifies the account management system to which to send the token request based on an association between resource account application ID and the account management system.

The account management system processes the received token ID in association with the transaction ID and/or resource account ID information sent by the mobile device and generates a transaction token comprising a token ID and a specified transaction resource value. The token ID within the generated token may match or otherwise correspond to the token ID sent by the mobile device. The mobile device receives the transaction token from the account management system and may send the token to the transaction terminal to commence tokenized transaction processing (steps 720 and 722) and the process ends at step 724.

Figure 8:
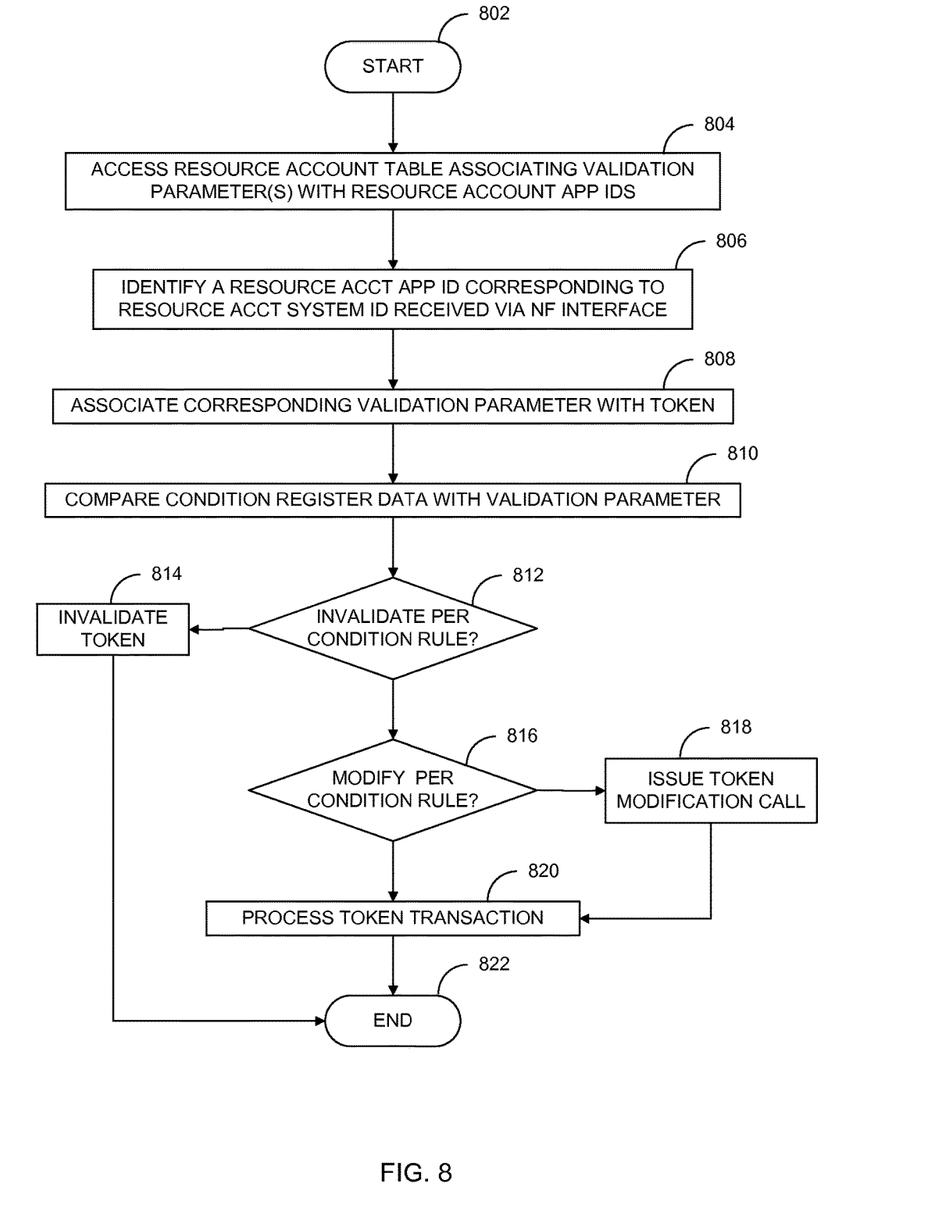
FIG. 8 is a flow diagram depicting steps performed during processing of a transaction token in accordance with an embodiment.

FIG. 8 is a flow diagram depicting steps performed during processing of a transaction token in accordance with an embodiment. The process begins as shown at steps 802 and 804 with a token state manager accessing a resource account table that associates validation parameters with resource account IDs and resource account application program IDs. The token state manager identifies a resource account and/or a resource account application corresponding to a resource account system ID received from a transaction terminal and associates the corresponding validation parameter value(s) with a transaction token (steps 806 and 808).

Prior to or during a resource transaction, such as a POS transaction, a token state manager compares the registers values, such as may be accessed directed from the register or stored within a condition register table, with validation parameter values that have been associated with a transaction token (step 810). The token state manager applies transaction condition rules that specify whether to invalidate the subject transaction token(s) or modify or cancel the transaction based on the comparison. The transaction condition rules may comprise program instructions included with or otherwise associated with the token state manager. As shown at steps 812 and 814, the transaction condition rules may direct the token state manager to invalidate the token based on the comparison of the condition register data with the validation parameter value(s). As shown at steps 812, 816, and 818, the transaction condition rules may direct the token state manager to modify the transaction token (e.g., reduce the transaction value), resulting in a token modification call prior to processing and completing a tokenized transaction (steps 820 and 822).

Figure 9:
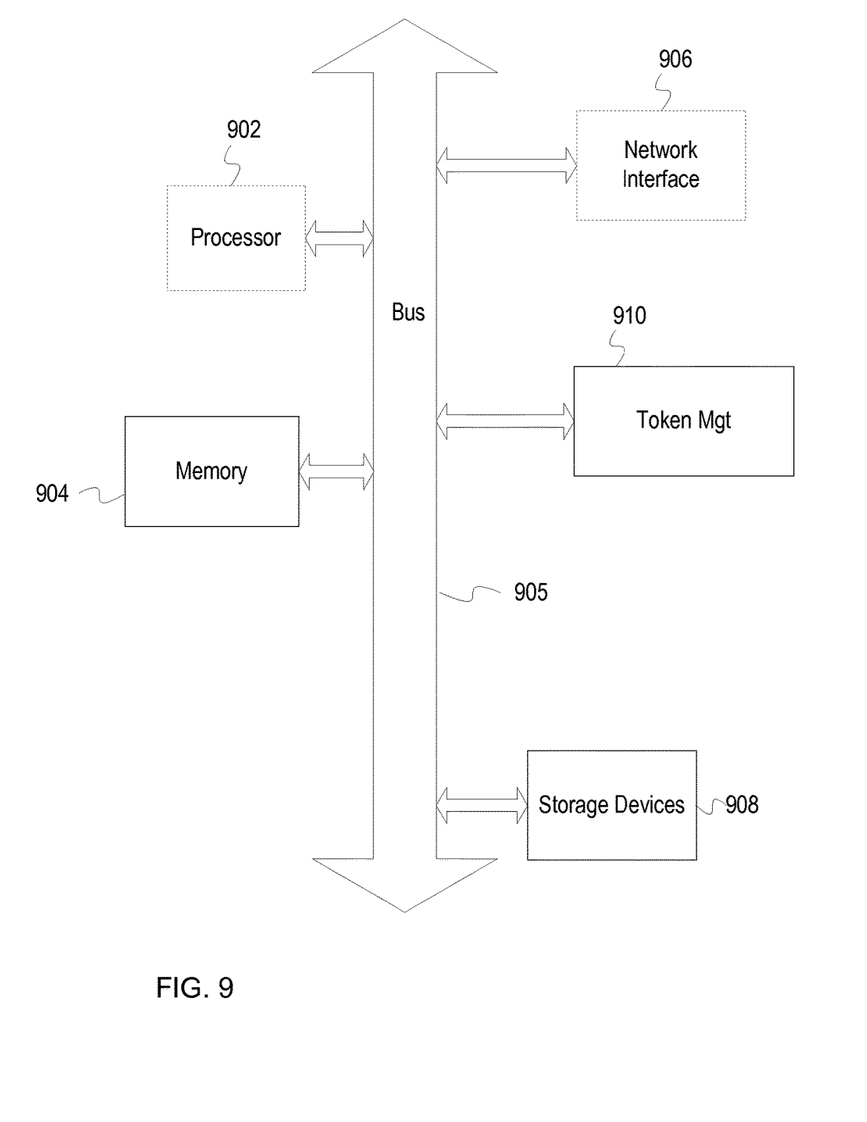
FIG. 9 is a block diagram of a computer system for performing the functions described and depicted with reference to FIGS. 1-8.

FIG. 9 depicts an example computer system that include a token management unit 910. The computer system includes a processor 902 (possibly including multiple processors, multiple cores, multiple nodes, and/or implementing multi-threading, etc.). The computer system includes memory 904 which may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes an interconnect 905 (e.g., PCI, ISA, PCI-Express, HyperTransport®, InfiniBand®, NuBus, etc.), a network interface 906 (e.g., an Ethernet interface, a Frame Relay interface, SONET interface, wireless interface, etc.), and a storage device(s) 908 (e.g., optical storage, magnetic storage, etc.). Token management unit 910 embodies functionality to implement features described above with reference to FIGS. 1-8. Token management unit 910 may perform operations for receiving and processing transaction tokens and token-associated validation parameters. Any one of these functionalities may be partially (or entirely) implemented in hardware and/or on processor 902. For example, the functionality may be implemented with an application specific integrated circuit, in logic implemented in processor 902, in a co-processor on a peripheral device or card, etc. Further, realizations may include fewer or additional components not illustrated in FIG. 9 (e.g., additional network interfaces, peripheral devices, etc.).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A computer program product for controlling a mobile device in processing a resource account transaction, said computer program product comprising:
    a non-transitory computer readable storage medium having program instructions embodied therewith, the program instructions comprising:
        program instructions to receive, by the mobile device via a first communication interface, a resource account system ID from a near-field transaction terminal;
        program instructions to select, by the mobile device, a locally stored resource account based on the received resource account system ID;
        program instructions to send, by the mobile device via the first communication interface, a resource account application ID corresponding to the selected resource account to the near-field transaction terminal;
        program instructions to receive, by the mobile device, a first token ID from the near-field transaction terminal, wherein the first token ID is associated with the selected resource account;
        program instructions to send, by the mobile device via a second communication interface, the first token ID to a resource account management system; and
        program instructions to receive, by the mobile device, from the resource account management system, a transaction token comprising a second token ID associated with a specified transaction resource value;
        program instructions to validate, by the mobile device, the transaction token; and
        program instructions to transmit, by the mobile device to the near filed transaction terminal, the token as part of a transaction on the resource account.

2. The computer program product of claim 1, further comprising program instructions to select the resource account management system to which to send the first token ID based on an association between the resource account management system and the resource account application ID.

3. The computer program product of claim 1, wherein said program instructions to select a locally stored resource account further comprise:
    program instructions to access a locally stored resource account table that associates a transaction validation parameter with at least one resource account application ID; and
    program instructions to identify a resource account application ID within the resource account table corresponding to the received resource account system ID.

4. The computer program product of claim 3, further comprising:
    program instructions to associate the transaction validation parameter with the transaction token;
    program instructions to compare, by a token state manager, condition register data with the transaction validation parameter; and
    program instructions to issue, by the token state manager, a transaction modification call based on the result of said comparing condition register data with the transaction validation parameter.

5. The computer program product of claim 1, further comprising:

program instructions to receive a transaction ID from the near-field transaction terminal; and program instructions to send the transaction ID in association with the first token ID to the account management system.

6. The computer program product of claim 1, wherein said program instructions to select a locally stored resource account comprise:

program instructions to access a locally stored resource account table that associates at least one resource account application ID with one or more resource account IDs;

program instructions to identify a resource account application ID within the resource account table corresponding to the received resource account system ID; and program instructions to select a resource account ID associated with the identified resource account application ID.

7. The computer program product of claim 6, further comprising program instructions to send the selected resource account ID to the account management system in association with the first token ID.

8. A wireless electronic device comprising:

a processor; and a non-transitory computer readable storage medium having program instructions embodied therewith, the program instructions executable by the processor, the program instructions including program instructions to receive, by the wireless electronic device, via a first communication interface, a resource account system ID from a near-field transaction terminal;

program instructions to select, by the wireless electronic device, a locally stored resource account based on the received resource account system ID;

program instructions to send, by the wireless electronic device via the first communication interface, a resource account application ID corresponding to the selected resource account to the near-field transaction terminal;

program instructions to receive, by the wireless electronic device, a first token ID from the near-field transaction terminal, wherein the first token ID is associated with the selected resource account;

program instructions to send, by the wireless electronic device via a second communication interface, the first token ID to a resource account management system; and program instructions to receive, by the wireless electronic device from the resource account management system, a transaction token comprising a second token ID associated with a specified transaction resource value.

9. The wireless electronic device of claim 8, further comprising program instructions to select, by the wireless electronic device, the resource account management system to which to send the first token ID based on an association between the resource account management system and the resource account application ID.

10. The wireless electronic device of claim 8, wherein said program instructions to select a locally stored resource account further comprise program instructions to access a locally stored resource account table that associates a transaction validation parameter with at least one resource account application ID; and program instructions to identify a resource account application ID within the resource account table corresponding to the received resource account system ID.

11. The wireless electronic device of claim 10, further comprising:

program instructions to associate a transaction validation parameter that is associated with the identified resource account application ID with the transaction token;

program instructions to invoke a token state manager;

program instructions to compare, by the token state manager, condition register data with the transaction validation parameter; and issue, by the token state manager, a transaction modification call based on the result of said comparing condition register data with the transaction validation parameter.

12. The wireless electronic device of claim 8, further comprising:

program instructions to receive a transaction ID from the near-field transaction terminal; and program instructions to send the transaction ID in association with the first token ID to the account management system.

13. The wireless electronic device of claim 8, wherein said program instructions to cause the wireless electronic device to select a locally stored resource account comprise:

program instructions to access a locally stored resource account table that associates at least one resource account application ID with one or more resource account IDs;

program instructions to identify a resource account application ID within the resource account table corresponding to the received resource account system ID; and program instructions to select a resource account ID associated with the identified resource account application ID.

14. The wireless electronic device of claim 13, further comprising program instructions to send the selected resource account ID to the account management system in association with the first token ID.

* * * * *